(12) United States Patent
Adachi et al.

(10) Patent No.: US 8,587,879 B2
(45) Date of Patent: Nov. 19, 2013

(54) FIXED FOCUS LENS

(75) Inventors: Nobuyuki Adachi, Saitama (JP);
Yasuhiko Obikane, Saitama (JP);
Takahiko Sakai, Saitama (JP)

(73) Assignee: Tamron Co., Ltd., Saitama-shi (JP)

( * ) Notice: Subject to any disclaimer, the term of this patent is extended or adjusted under 35 U.S.C. 154(b) by 33 days.

(21) Appl. No.: 13/267,468

(22) Filed: Oct. 6, 2011

(65) Prior Publication Data
US 2012/0162787 A1 Jun. 28, 2012

(30) Foreign Application Priority Data

Dec. 24, 2010 (JP) .................................. 2010-288863

(51) Int. Cl.
*G02B 9/14* (2006.01)
*G02B 3/02* (2006.01)

(52) U.S. Cl.
USPC .......................................... 359/785; 359/715

(58) Field of Classification Search
USPC .................................................. 359/753, 785
See application file for complete search history.

(56) References Cited

U.S. PATENT DOCUMENTS

| | | | |
|---|---|---|---|
| 4,812,026 A | 3/1989 | Iima | |
| 6,421,189 B1 | 7/2002 | Sensui | |
| 7,443,599 B2 | 10/2008 | Kohno et al. | |
| 7,796,344 B2 | 9/2010 | Adachi et al. | |
| 8,085,475 B2 | 12/2011 | Miyazaki et al. | |
| 2012/0262806 A1 * | 10/2012 | Huang | 359/784 |

FOREIGN PATENT DOCUMENTS

| | | |
|---|---|---|
| JP | 61-286813 A | 12/1986 |
| JP | 62-112114 A | 5/1987 |
| JP | 63-194214 A | 8/1988 |
| JP | 63 208816 A | 8/1988 |
| JP | 4-258813 A | 9/1992 |
| JP | 7-13079 A | 1/1995 |
| JP | 9-159911 A | 6/1997 |
| JP | 2000-227546 A | 8/2000 |
| JP | 2000-347099 A | 12/2000 |
| JP | 2003-043348 A | 2/2003 |
| JP | 3445554 B2 | 6/2003 |
| JP | 2003-215451 A | 7/2003 |
| JP | 3950571 B2 | 4/2007 |
| JP | 2007-232974 A | 9/2007 |
| JP | 2009-265657 A | 11/2009 |
| JP | 2010-176098 A | 8/2010 |

* cited by examiner

*Primary Examiner* — William Choi
(74) *Attorney, Agent, or Firm* — Foley & Lardner LLP

(57) ABSTRACT

A fixed focus lens comprising, sequentially from an object side, a first lens group having a positive refractive power; a second lens group having a negative refractive power; and a third lens group having a positive refractive power. The first lens group includes an aperture stop. The second lens group is configured by a single lens element. During focusing, the second lens group moves along an optical axis and the first lens group and the third lens group are fixed with respect to an imaging plane.

4 Claims, 16 Drawing Sheets

FOURTH EXAMPLE

FIXED FOCUS LENS

BACKGROUND OF THE INVENTION

1. Field of the Invention

The present invention relates to a fixed focus lens used in 35 mm cameras, video cameras, digital still cameras, and the like.

2. Description of the Related Art

To make a captured image and the viewfinder image coincide, single lens reflex cameras are equipped with a mechanism by which light that has passed through the imaging lens is reflected by a mirror placed in front of the film and the light is guided to an optical viewfinder. Consequently, fixed focus lenses used in single lens reflex cameras must have a long back focus, limiting degrees of freedom in terms of design. Digital cameras, on the other hand, merely have to display the captured image on an electronic viewfinder to accomplish the same thing as conventional single lens reflex cameras. Therefore, by omitting the optical viewfinder and the mirror for guiding light to form the image at the optical viewfinder, a compact apparatus is realized, the so-called "mirror-less single lens camera" has been introduced. In mirror-less single lens cameras, the back focus can be shortened, thereby affording the advantage of improved degrees of freedom in the design of the fixed focus lens used in these cameras. Consequently, there are also a large number of fixed focus lenses that can be mounted to mirror-less single lens cameras (see, for example, Japanese Patent Nos. 3950571 and 3445554, and Japanese Patent Application No. 2003-43348).

The optical system disclosed in Japanese Patent No. 3950571 achieves simplification in that the focusing lens group is configured by one negative lens, nonetheless, configurations of other lens groups include numerous lenses and do not facilitate simplification. Further, although the shortening of focusing stroke is considered, with the focusing lens group disposed farther on the object side than the diaphragm, the front element diameter becomes larger consequent to the position of the entrance pupil becoming deep. For these reasons the optical system disclosed in Japanese Patent No. 3950571 does not sufficiently achieve reductions in size and is not suitable for recent mirror-less cameras of which further size reductions are demanded.

The optical system disclosed in Japanese Patent No. 3445554 achieves a simpler configuration than the optical system disclosed in Japanese Patent No. 3950571, but with respect to the focusing stroke, the focusing sensitivity of the image focusing is small and consequently, when images are captured at the minimum object distance, the focusing group has to be moved greatly and thus, a reduction in the size of the optical system cannot be achieved.

The optical system disclosed in Japanese Patent Application Laid-Open Publication No. 2003-43348 facilitates simplification by a two-lens configuration of the focusing group, but here again, since the focusing sensitivity is small, when images are captured at the minimum object distance, the focusing group has to be moved greatly and thus, a reduction in the size of the optical system cannot be achieved.

Thus, conventional fixed focus lenses, such as those recited in the patent documents above do not achieve sufficient size and weight reductions.

SUMMARY OF THE INVENTION

It is an object of the present invention to at least solve the above problems in the conventional technologies.

A fixed focus lens according to one aspect of the invention includes, sequentially from an object side, a first lens group having a positive refractive power; a second lens group having a negative refractive power; and a third lens group having a positive refractive power. The first lens group includes an aperture stop. The second lens group is configured by a single lens element. During focusing, the second lens group moves along an optical axis and the first lens group and the third lens group are fixed with respect to an imaging plane.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Figure 1:
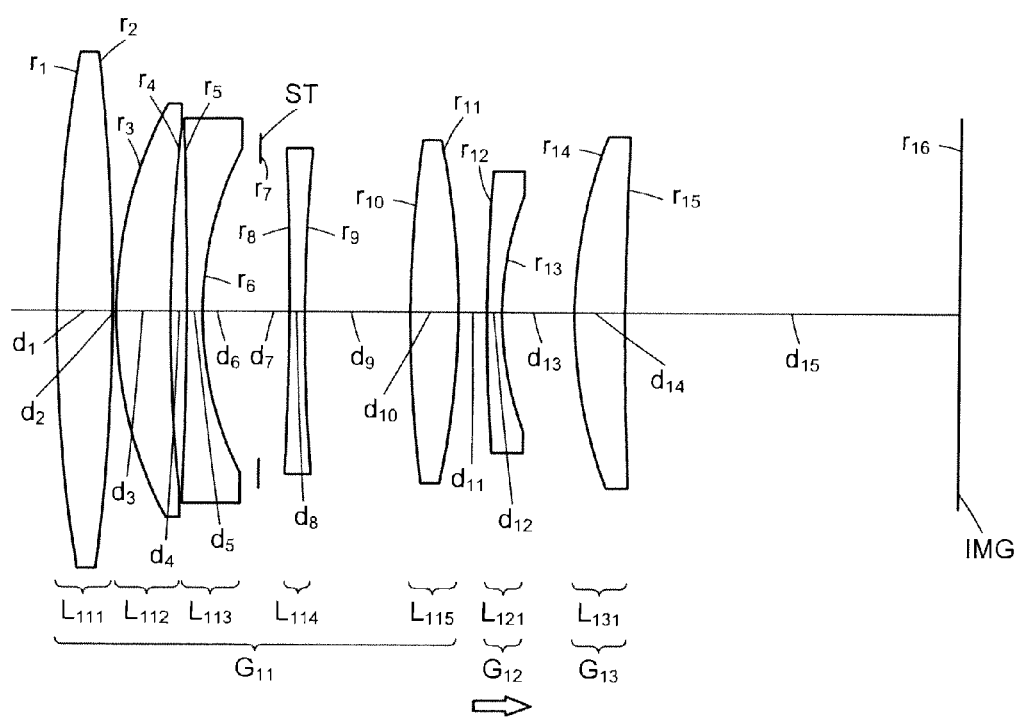
FIG. 1 is a cross sectional view (along the optical axis) of a fixed focus lens according a first example.

Referring to the accompanying drawings, exemplary embodiments according to the present invention are explained in detail below.

A fixed focus lens according to the present invention includes sequentially from the object side, a first lens group having a positive refractive power, a second lens group having a negative refractive power, and a third lens group having a positive refractive power.

To reduce the overall length of the optical system, the combined magnification of the second and the third lens groups, which are subsequent the first lens group, is preferably increased and the focal length of the first lens group is shortened. However, if the magnification of the second lens group and the third lens group is unnecessarily large, aberration occurring at the first lens group is intensified at subsequent groups. To prevent this negative effect, the first lens group has to minimize the aberration that occurs therein. To favorably correct aberration by the first lens group, the first lens group includes at least two positive lenses and negative lenses, respectively. Thus, in the fixed focus lens according to the present invention, the first lens group includes at least two positive lenses and at least two negative lenses. The first lens group is fixed with respect to the imaging plane, even during focusing.

Further, in the fixed focus lens according to the present invention, an aperture stop is disposed within the first lens group. Preferably, at the focal length of a 35 mm equivalent focal length camera, in a standard lens range in the neighborhood of 35 mm to 50 mm, the first lens group is separated into a front group and a rear group, between which an aperture stop is disposed. By symmetrically disposing the lenses with respect to the aperture stop, various types of aberration can be appropriately corrected. On the other hand, for use at the focal length of a 35 mm equivalent focal length camera, in an intermediate telephoto range in the neighborhood of 90 mm to 150 mm, the aperture stop does not necessarily have to be disposed in an intermediate position between the front group and the rear group. In this case, the aperture stop may be disposed nearer to the imaging plane in the first lens group. A negative lens is disposed adjacent to aperture stop, on the imaging plane side. By such a configuration, in particular, favorable correction of sagittal image plane curvature can be expected. Further, by disposing the aperture stop within the first lens group, which is farther on the object side than the second lens group, not only are various types of aberration appropriately corrected, but the front element diameter can be reduced, which is useful.

The second lens group preferably includes a single lens element. Focusing is performed by moving the second lens group in a direction along the optical axis. By reducing the weight of the focusing group, the load on the autofocus mechanism can be reduced, enabling reduced power consumption and a smaller outer diameter of the barrel. A single lens element includes a single ground lens, an aspheric lens, a compound aspheric lens, and a cemented lens, but does not include non-cemented lenses having a space therebetween, such as two positive lenses.

The third lens group is fixed with respect to the imaging plane. Although the third lens group can be moveable, the third lens group is preferably fixed to prevent damage of the lens support mechanism by the insertion of, for example, a finger from outside barrel.

By the above configuration, the fixed focus lens according to the present invention is configured by fewer lens elements, enabling weight reductions and shortening of the overall optical system length. Further, disposal the aperture stop at an appropriate position within the first lens group brings about favorable correction of various types of aberration and enables the front element diameter of the optical system to be decreased.

One object of the present invention is to provide a fixed focus lens that is compact, light-weight and has an inner focusing system of favorable imaging performance. To further ensure this object is achieved, in addition to the configuration above, various conditions indicated below are further set.

The following conditional expression is preferably satisfied, where $\beta 2G$ is paraxial magnification of the second lens group, in a state of infinity focus and $\beta 3G$ is paraxial magnification of the third lens group, in a state of infinity focus, in the fixed focus lens.

$$0.7 < |(1-\beta 2G) \times \beta 3G| < 7.0 \tag{1}$$

Conditional expression (1) determines the stroke amount of the focusing group from the state of infinity focus to the focus state for the minimum object distance, and prescribes focusing sensitivity of the optical system. The value prescribed by conditional expression (1) is an important element that determines the size and imaging performance of the optical system. Below the lower limit of conditional expression (1), the stroke amount of the focusing group increases and when the focus state for the desired minimum object distance is established, increased overall optical length becomes unavoidable and therefore, undesirable. On the other hand, above the upper limit of conditional expression (1), the magnification of the second lens group and subsequent groups increases, which particularly invites deterioration of off-axis, chromatic difference of magnification, whereby the number of lens elements included in the first lens group has to be increased to prevent this adverse state, making a simple configuration of the optical system difficult and therefore, undesirable.

If conditional expression (1) is further within the following range, more favorable effects can be expected.

$$0.8 < |(1-\beta 2G) \times \beta 3G| < 6.5 \tag{1}'$$

By satisfying the range prescribed by conditional expression (1)', a shorter overall length of the optical system can be achieved along with improved imaging performance.

If conditional expression (1)' is further within the following range, more favorable effects can be expected.

$$0.9 < |(1-\beta 2G) \times \beta 3G| < 6.0 \tag{1}''$$

By satisfying the range prescribed by conditional expression (1)'', an even shorter overall length of the optical system can be achieved along with further improved imaging performance.

To simplify the configuration of the optical system, in the fixed focus lens according to the present invention, the third lens group is configured by one positive lens, or a positive lens and a negative lens. The third lens group has to have a positive refractive power to increase the angle of incidence of the chief ray to the imaging plane. Thus, the fixed focus lens according to the present invention preferably satisfies the following conditional expression, where F3 is the focal length of the third lens group and F is the focal length of the entire optical system.

$$0.4 < F3/F < 1.8 \tag{2}$$

Conditional expression (2) expresses a condition for achieving both shortening of the overall length of the optical system and maintaining imaging performance. Below the lower limit of conditional expression (2), the back focus of the optical system becomes short and the focusing sensitivity cannot be increased, whereby increases in the overall length of the optical system become unavoidable and thus, is not desirable. On the other hand, above the upper limit of conditional expression (2), although the focusing sensitivity can be increased, the back focus of the optical system becomes too long and thus, is not desirable.

If conditional expression (2) is further within the following range, more favorable effects can be expected.

$$0.45 < F3/F < 1.65 \qquad (2)'$$

By satisfying the range prescribed by conditional expression (2)', a shorter overall length of the optical system can be achieved along with further improved imaging performance.

If conditional expression (2)' is further within the following range, more favorable effects can be expected. By satisfying the range specified by the conditional expression (2)", an even shorter overall length of the optical system can be achieved along with further improved imaging performance.

$$0.5 < F3/F < 1.5 \qquad (2)''$$

In the focus lens according to the present invention, the surface on the imaging plane side of the second lens group plays a role in correcting underside image plane curvature occurring at the first and the second lens groups, to the overside. Thus, the fixed focus lens according to the present invention preferably satisfies the following conditional expression, where FR2 is the radius of curvature of the surface on the imaging plane side of the second lens group, and F is the focal length of the entire optical system.

$$0.2 < FR2/F < 0.6 \qquad (3)$$

Conditional expression (3) prescribes the radius of curvature of the surface on the imaging plane side of the second lens group, to maintain imaging performance. Below the lower limit of conditional expression (3), image plane curvature is corrected to the over-side excessively, making it difficult to balance axial and off-axis imaging performance. Above the upper limit of conditional expression (3), conversely, the imaging plane curvature becomes too far on the underside and particularly at the minimum object distance, the imaging plane curvature becomes great, degrading imaging performance in the focus state for the minimum object distance and thus, is undesirable.

If conditional expression (3) is further within the following range, more favorable effects can be expected.

$$0.25 < FR2/F < 0.55 \qquad (3)'$$

By satisfying the range prescribed by conditional expression (3)', without sacrificing size reductions of the optical system, more favorable imaging performance can be obtained.

If conditional expression (3)' is further within the following range, even more favorable effects can be expected.

$$0.30 < FR2/F < 0.5 \qquad (3)''$$

By satisfying the range prescribed by conditional expression (3)", without sacrificing size reductions of the optical system, further improvements in imaging performance can be expected.

The fixed focus lens according to the present invention preferably satisfies the following conditional expressions, where nd is the average refractive index at d-line of the second lens group and υd is the average Abbe number at d-line of the second lens group.

$$1.50 < nd < 2.0 \qquad (4)$$

$$25 < \upsilon d < 68 \qquad (5)$$

Conditional expression (4) prescribes an average refractive index at d-line of the second lens group and conditional expression (5) prescribes an average Abbe number at d-line of the second lens group. Inclusion of a lens having a high refractive index in the second lens group is advantageous because the aberration can be kept to a minimum and the focusing sensitivity can be increased. Inclusion of a high dispersion lens in the second lens group is effective in correcting chromatic aberration occurring at the first lens group, particularly chromatic aberration of magnification. Here, deviating from the conditions prescribed by conditional expressions (4) and (5) and configuring the second lens group of a lens having a low refractive index and low dispersion, results in an inability to correct at the second lens group, the aberration that could not be completely corrected at the first lens group.

If conditional expressions (4) and (5) are further within the following ranges, more favorable effects can be expected.

$$1.53 < nd < 1.95 \qquad (4)'$$

$$30 < \upsilon d < 65 \qquad (5)'$$

By satisfying the ranges prescribed by conditional expressions (4)' and (5)', more favorable effects can be expected and without sacrificing size reductions of the optical system, more favorable aberration correction can be realized.

If conditional expression (4)' and (5)' further satisfy the following ranges, more favorable effects can be expected.

$$1.55 < nd < 1.90 \qquad (4)''$$

$$31 < \upsilon d < 65 \qquad (5)''$$

By satisfying the ranges prescribed by conditional expressions (4)" and (5)", without sacrificing size reductions of the optical system, more favorable aberration correction can be realized.

Average refractive index is, for example, the average value of the materials from which the compound aspheric lens, etc. is made, forming the single lens element. Similarly, the average Abbe number is, for example, the average value of the materials from which the compound aspheric lens, etc. is made, forming the single lens element. Further, in the fixed focus lens according to the present invention, the focal length of the first lens group is greatly affected by the overall length of the optical system. To shorten the overall length of the optical system, the focal length of the first lens group has to be appropriately set. Thus, the fixed focus lens according to the present invention preferentially satisfies the following condition, where F1 is the focal length of the first lens group and F is the focal length of the entire optical system.

$$0.3 < F1/F < 1.1 \qquad (6)$$

Conditional expression (6) prescribes a focal length of the first lens group. Below the lower limit of conditional expression (6), the magnification of lens groups subsequent to the first lens group increases, a large number of lens are required, and the realization of an optical system having favorable imaging performance with fewer lenses becomes difficult. On the other hand, above the upper limit of conditional expression (6), the overall length of the optical system increases, sacrificing size reductions of the optical system.

If conditional expression (6) is further within the following range, more favorable effects can be expected.

$$0.35 < F1/F < 1.0 \qquad (6)'$$

By satisfying the range prescribed by conditional expression (6)', high performance can be maintained while realizing a simple, compact fixed focus lens.

If conditional expression (6)' is further within the following range, more favorable effects can be expected.

$$0.40 < F1/F < 0.9 \qquad (6)''$$

By satisfying the range prescribed by conditional expression (6)", high optical performance can be maintained while realizing a simpler and more compact fixed focus lens.

As described, the fixed focus lens according to the present invention has few lenses and thus, is light-weight and enables a shortening of the overall length of the optical system. By disposing the aperture stop at an appropriate position within the first lens group, various types of aberration can be favorably corrected and the front element diameter of the optical system can be reduced. Further, by satisfying each of the conditional expressions above, a more compact and light-weight fixed focus lens can be realized, having an inner focusing system of favorable imaging performance.

With reference to the accompanying drawings, examples of the fixed focus lens according to the present invention will be described. The invention is not limited by the examples below.

FIG. 1 is a cross sectional view (along the optical axis) of the fixed focus lens according a first example. The fixed focus lens includes sequentially from an object side (object not depicted), a first lens group $G_{11}$ having a positive refractive power, a second lens group $G_{12}$ having a negative refractive power, and a third lens group $G_{13}$ having a positive refractive power. At an imaging plane IMG at the rear (right side in the drawing) of the third lens group $G_{13}$, the light receiving surface of an imaging sensor such as a CCD, CMOS, etc. is disposed.

The first lens group $G_{11}$ includes sequentially from the object side, a positive lens $L_{111}$, a positive lens $L_{112}$, a negative lens $L_{113}$, a negative lens $L_{114}$, and a positive lens $L_{115}$. Between the negative lens $L_{113}$ and the negative lens $L_{114}$, an aperture stop ST, which prescribes a given aperture, is disposed. The surface on the object side of the negative lens $L_{114}$ is aspheric. The first lens group $G_{11}$ is fixed and does not move during focusing.

The second lens group $G_{12}$ is configured by a negative lens $L_{121}$. The surface on the imaging plane IMG side of the negative lens $L_{121}$ is aspheric. The second lens group $G_{12}$ moves along the optical axis, from the object side toward the imaging plane IMG side, whereby focusing is performed from a state of infinity focus to the focus state for the minimum object distance.

The third lens group $G_{13}$ is configured by a positive lens $L_{131}$. The third lens group $G_{13}$ is also fixed and does not move during focusing.

Here, various values related to the fixed focus lens according the first example are given.

(Lens data)

$r_0 = \infty$ (object surface)
$d_0 = D(0)$
$r_1 = 56.088$
$d_1 = 2.941$    $nd_1 = 1.91082$    $vd_1 = 35.2$
$r_2 = -78.854$
$d_2 = 0.200$
$r_3 = 16.767$
$d_3 = 2.831$    $nd_2 = 1.91082$    $vd_2 = 35.2$
$r_4 = 60.401$
$d_4 = 0.879$
$r_5 = -153.141$
$d_5 = 0.800$    $nd_3 = 1.84666$    $vd_3 = 23.8$
$r_6 = 13.386$
$d_6 = 3.013$
$r_7 = \infty$ (aperture stop)
$d_7 = 1.600$
$r_8 = -123.515$ (aspheric surface)
$d_8 = 0.800$    $nd_4 = 1.68893$    $vd_4 = 31.2$ -continued $r_9 = 66.188$
$d_9 = 5.540$
$r_{10} = 48.146$
$d_{10} = 2.497$    $nd_5 = 1.91082$    $vd_5 = 35.2$
$r_{11} = -30.362$
$d_{11} = D(11)$
$r_{12} = 69.746$
$d_{12} = 0.800$    $nd_6 = 1.68893$    $vd_6 = 31.2$
$r_{13} = 12.168$ (aspheric surface)
$d_{13} = D(13)$
$r_{14} = 18.127$
$d_{14} = 2.638$    $nd_7 = 1.72916$    $vd_7 = 54.7$
$r_{15} = 145.590$
$d_{15} = FB$
$r_{16} = \infty$ (imaging plane)

(Constant of the cone (K) and aspheric coefficients ($A_4$, $A_6$, $A_8$, $A_{10}$))
(eighth plane)

$K = 0$,
$A_4 = 1.29983 \times 10^{-7}$, $A_6 = 8.66172 \times 10^{-8}$,
$A_8 = -1.05350 \times 10^{-9}$, $A_{10} = 1.64719 \times 10^{-11}$
(thirteenth plane)

$K = 0$,
$A_4 = -1.93195 \times 10^{-5}$, $A_6 = -2.22932 \times 10^{-7}$,
$A_8 = 1.22482 \times 10^{-9}$, $A_{10} = -3.13255 \times 10^{-11}$ (Values for focusing states)

|  | Infinity | 0.025x | Minimum object distance (0.089x) |
|---|---|---|---|
| Focal length of entire optical system (F) | 35.270 | 34.883 | 33.704 |
| Focal length of first lens group $G_{11}$ (F1) | 27.950 | | |
| Focal length of third lens group $G_{13}$ (F3) | 28.150 | | |
| F no. | 2.00 | 2.01 | 2.06 |
| Half angle of view (ω) | 13.56 | 13.36 | 12.85 |
| Image height | 8.50 | 8.50 | 8.50 |
| Length of optical system | 47.343 | 47.360 | 47.414 |
| D(0) | ∞ | 1414.116 | 401.999 |
| D(11) | 1.500 | 2.083 | 3.5945 |
| D(13) | 3.795 | 3.212 | 1.700 |
| FB (back focus) | 17.50 | 17.50 | 17.50 |

(Values related to conditional expression (1))
Paraxial magnification of second lens group $G_{12}$, at infinity focus (β2G) = 4.00
Paraxial magnification of third lens group $G_{13}$, at infinity focus (β3G) = 0.32
|(1 − β2G) × β3G| = 0.96
(Values related to conditional expression (2))
F3/F = 0.80
(Values related to conditional expression (3))
FR2/F = 0.35
(Values related to conditional expression (4))
nd = 1.68893
(Values related to conditional expression (5))
vd = 31.2
(Values related to conditional expression (6))
F1/F = 0.80

Figure 2:
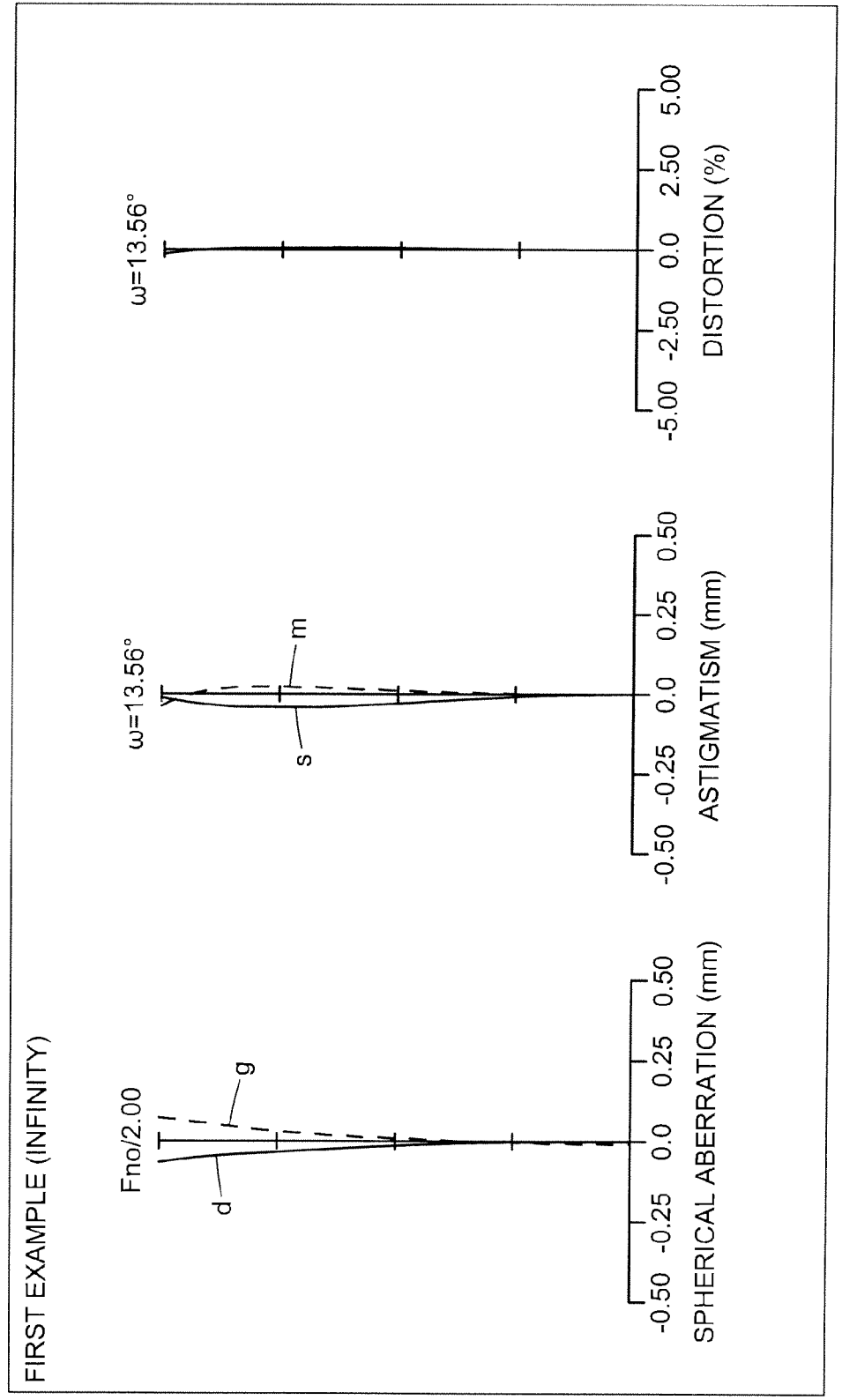
FIG. 2 is a diagram of various types of aberration of the fixed focus lens according the first example, at infinity focus.
Figure 3:
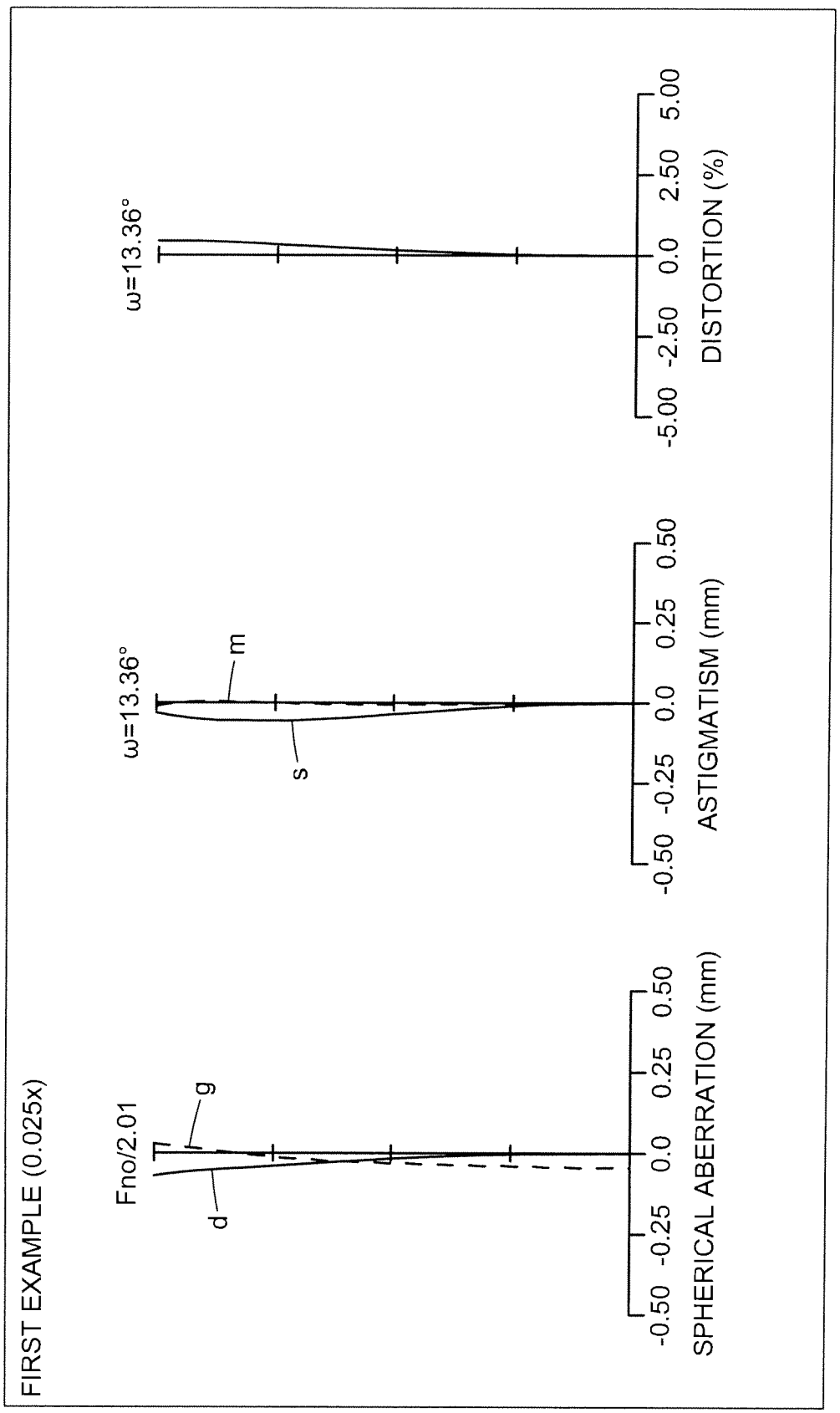
FIG. 3 is a diagram of various types of aberration of the fixed focus lens according the first example, at the focus state for a magnification of 0.025×.
Figure 4:
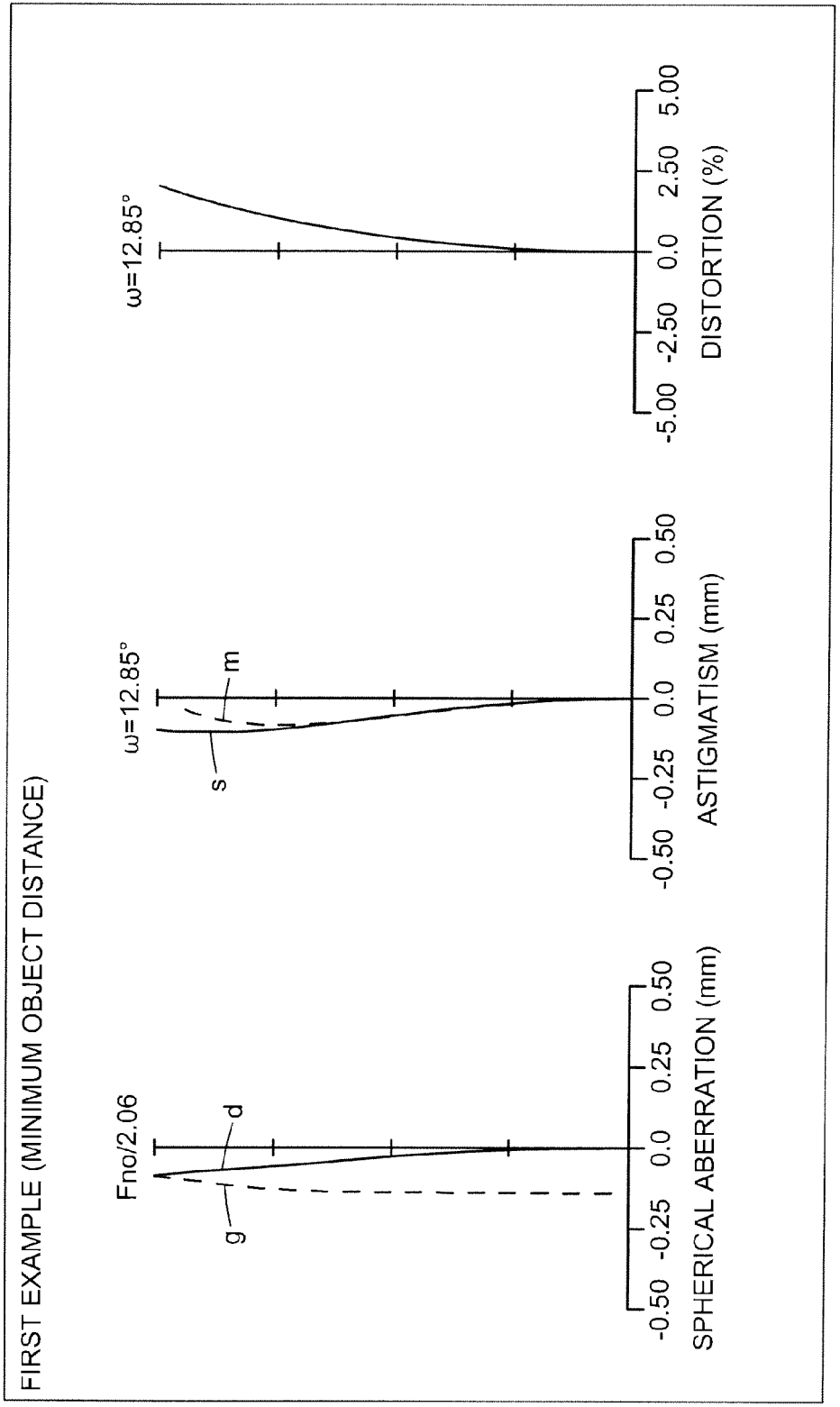
FIG. 4 is a diagram of various types of aberration of the fixed focus lens according the first example, at the focus state for the minimum object distance.

FIG. 2 is a diagram of various types of aberration of the fixed focus lens according the first example, at infinity focus. FIG. 3 is a diagram of various types of aberration of the fixed focus lens according the first example, at the focus state for a magnification of 0.025×. FIG. 4 is a diagram of various types of aberration of the fixed focus lens according the first example, at the focus state for the minimum object distance. In the drawings, g indicates the wavelength aberration corresponding to g-line (λ=435.83 nm), d indicates the wavelength aberration corresponding to d-line (λ=587.56 nm). Furthermore, in the drawings, s and m shown with respect to astigmatism, respectively indicate aberration at the sagittal image plane and at the meridonal image plane.

Figure 5:
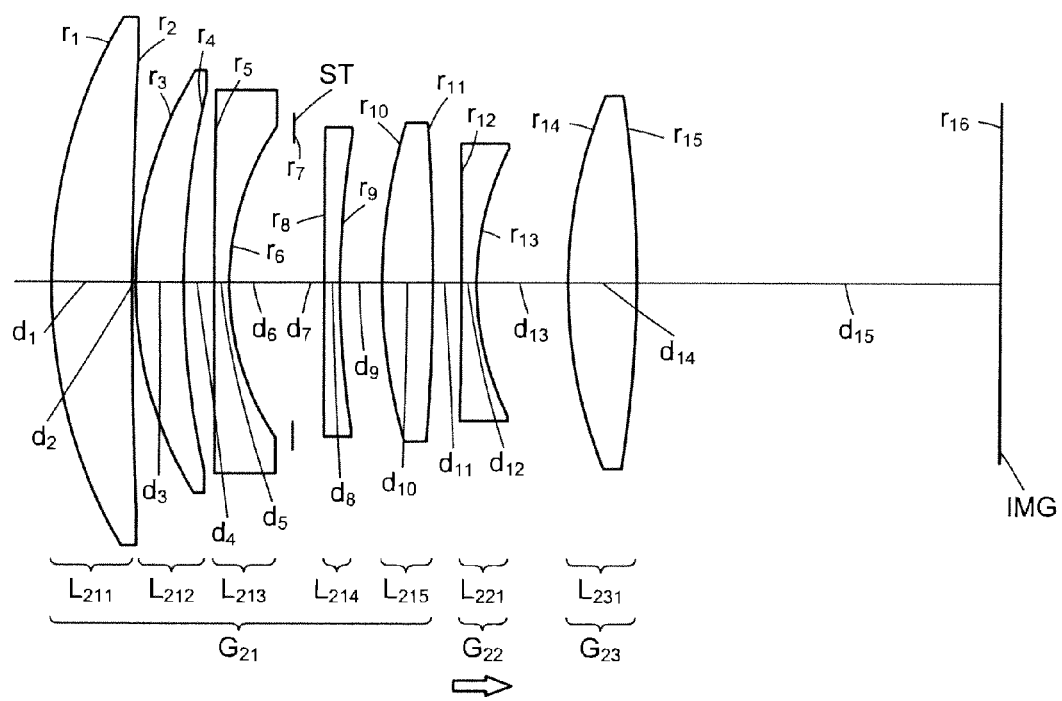
FIG. 5 is a cross sectional view (along the optical axis) of the fixed focus lens according a second example.

FIG. 5 is a cross sectional view (along the optical axis) of the fixed focus lens according a second example. The fixed focus lens includes sequentially from the object side (object not depicted), a first lens group $G_{21}$ having a positive refractive power, a second lens group $G_{22}$ having a negative refractive power, and a third lens group $G_{23}$ having a positive refractive power. At the imaging plane IMG at the rear (right side in the drawing) of the third lens group $G_{23}$, the light receiving surface of an imaging sensor such as a CCD, CMOS, etc. is disposed.

The first lens group $G_{21}$ includes sequentially from the object side, a positive lens $L_{211}$, a positive lens $L_{212}$, a negative lens $L_{213}$, a negative lens $L_{214}$, and a positive lens $L_{215}$. Between the negative lens $L_{213}$ and the negative lens $L_{214}$, the aperture stop ST, which prescribes a given aperture, is disposed. The surface on the object side of the negative lens $L_{211}$ is aspheric. The first lens group $G_{21}$ is fixed and does not move during focusing.

The second lens group $G_{22}$ is configured by a negative lens $L_{221}$. The surface on the imaging plane IMG side of the negative lens $L_{221}$ is aspheric. The second lens group $G_{22}$ moves along the optical axis, from the object side toward the imaging plane IMG side, whereby focusing is performed from a state of infinity focus to the focus state for the minimum object distance.

The third lens group $G_{23}$ is configured by a positive lens $L_{231}$. The third lens group $G_{23}$ is also fixed and does not move during focusing.

Here, various values related to the fixed focus lens according the second example are given.

(Lens data)

$r_0 = \infty$ (object surface)
$d_0 = D(0)$
$r_1 = 23.220$
$d_1 = 4.219$    $nd_1 = 1.88300$    $vd_1 = 40.8$
$r_2 = 218.633$
$d_2 = 0.200$
$r_3 = 17.836$
$d_3 = 2.517$    $nd_2 = 1.72916$    $vd_2 = 54.7$
$r_4 = 35.075$
$d_4 = 1.608$
$r_5 = 682.870$
$d_5 = 0.800$    $nd_3 = 1.80518$    $vd_3 = 25.5$
$r_6 = 12.539$
$d_6 = 3.317$
$r_7 = \infty$ (aperture stop)
$d_7 = 1.600$
$r_8 = 6515.162$ (aspheric surface)
$d_8 = 0.800$    $nd_4 = 1.68893$    $vd_4 = 31.2$
$r_9 = 41.134$
$d_9 = 2.209$
$r_{10} = 24.428$
$d_{10} = 2.603$    $nd_5 = 1.91082$    $vd_5 = 35.2$
$r_{11} = -97.665$
$d_{11} = D(11)$
$r_{12} = -391.408$
$d_{12} = 0.800$    $nd_6 = 1.56732$    $vd_6 = 42.8$
$r_{13} = 12.687$ (aspheric surface)
$d_{13} = D(13)$
$r_{14} = 21.841$
$d_{14} = 3.552$    $nd_7 = 1.62041$    $vd_7 = 60.3$
$r_{15} = -53.109$
$d_{15} = FB$
$r_{16} = \infty$ (imaging plane)

(Constant of the cone (K) and aspheric coefficients ($A_4$, $A_6$, $A_8$, $A_{10}$))
(eighth plane)

$K = 0$,
$A_4 = 1.31522 \times 10^{-6}$, $A_6 = 4.08403 \times 10^{-8}$,
$A_8 = 3.73283 \times 10^{-10}$, $A_{10} = 2.41864 \times 10^{-12}$
(thirteenth plane)

$K = 0$,
$A_4 = -2.17308 \times 10^{-5}$, $A_6 = -3.37294 \times 10^{-7}$,
$A_8 = 4.64174 \times 10^{-9}$, $A_{10} = -6.19872 \times 10^{-11}$ (Values for focusing states)

|  | Infinity | 0.025x | Minimum object distance (0.105x) |
|---|---|---|---|
| Focal length of entire optical system (F) | 40.00 | 39.84 | 38.72 |
| Focal length of first lens group $G_{21}$ (F1) | 33.64 | | |
| Focal length of third lens group $G_{23}$ (F3) | 25.41 | | |
| F no. | 2.00 | 2.04 | 2.16 |
| Half angle of view (ω) | 12.09 | 11.77 | 10.85 |
| Image height | 8.50 | 8.50 | 8.50 |
| Length of optical system | 49.337 | 49.346 | 49.395 |
| D(0) | ∞ | 1617.695 | 400.000 |
| D(11) | 1.500 | 2.225 | 4.572 |
| D(13) | 4.773 | 4.048 | 1.700 |
| FB (back focus) | 18.85 | 18.85 | 18.85 |

(Values related to conditional expression (1))
Paraxial magnification of second lens group $G_{22}$, at infinity focus (β2G) = 6.06
Paraxial magnification of third lens group $G_{23}$, at infinity focus (β3G) = 0.20
|(1 − β2G) × β3G| = 1.01
(Values related to conditional expression (2))
F3/F = 0.63
(Values related to conditional expression (3))
FR2/F = 0.32
(Values related to conditional expression (4))
nd = 1.56732
(Values related to conditional expression (5))
vd = 42.8
(Values related to conditional expression (6))
F1/F = 0.84

Figure 6:
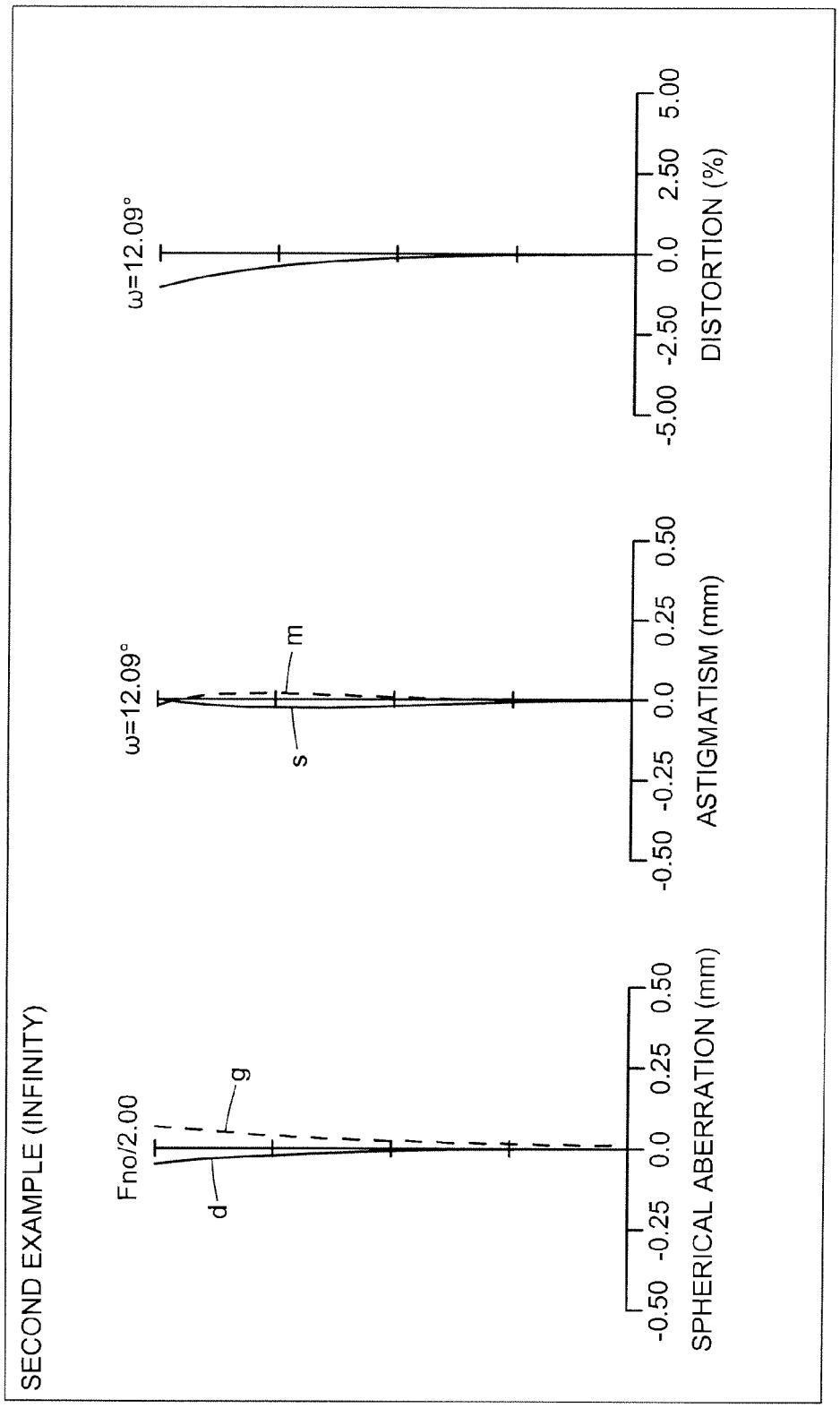
FIG. 6 is a diagram of various types of aberration of the fixed focus lens according the second example, at infinity focus.
Figure 7:
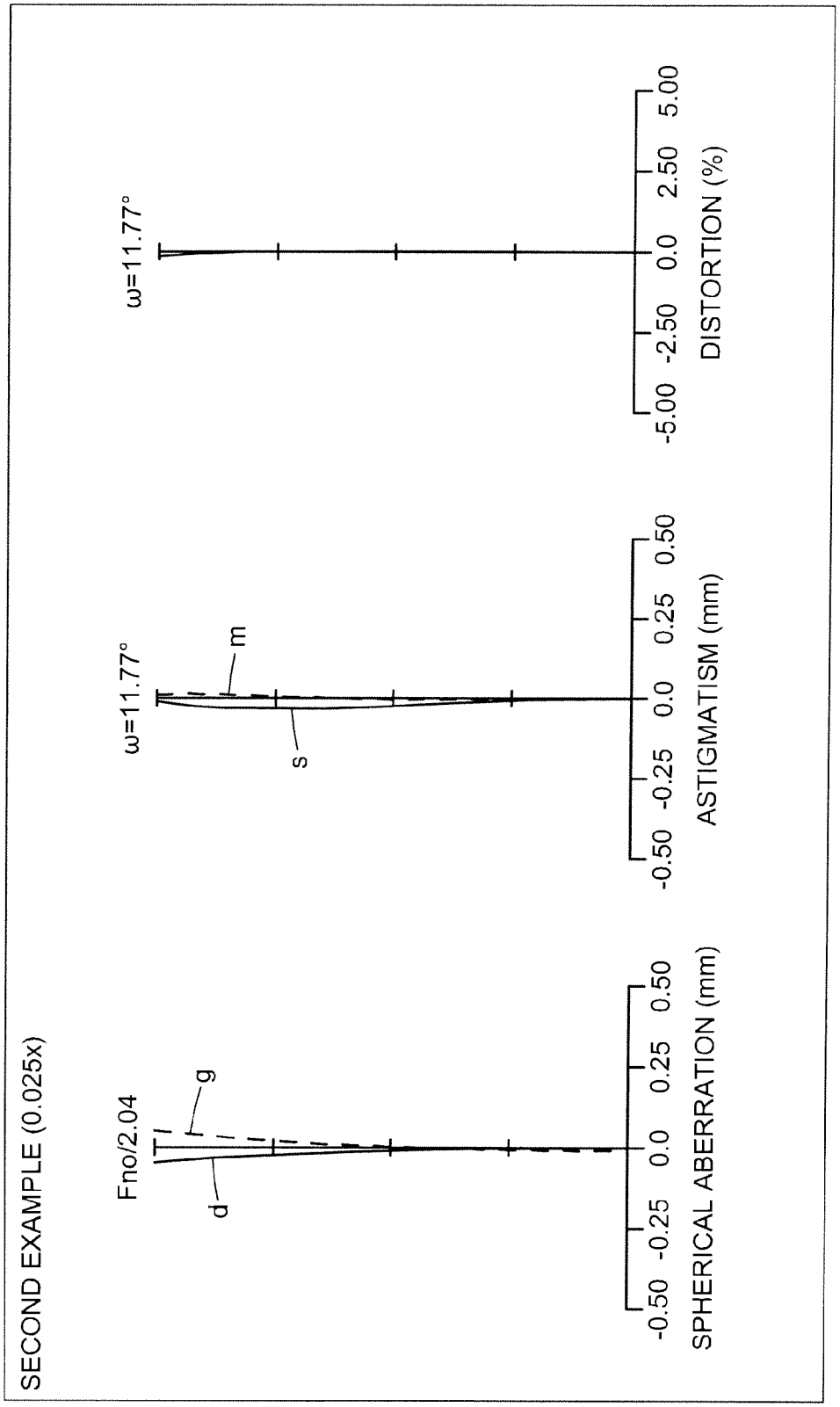
FIG. 7 is a diagram of various types of aberration of the fixed focus lens according the second example, at the focus state for a magnification of 0.025×.
Figure 8:
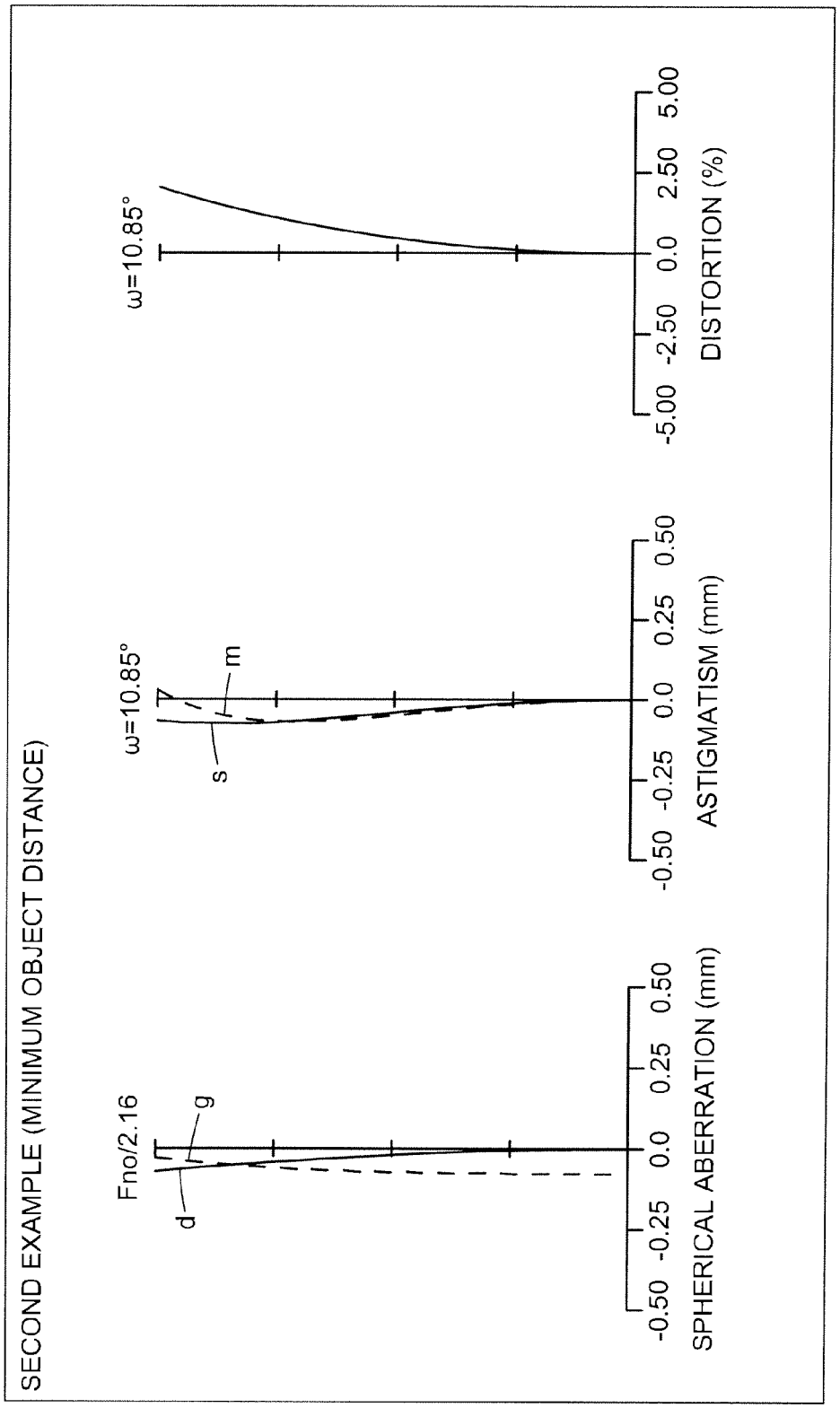
FIG. 8 is a diagram of various types of aberration of the fixed focus lens according the second example, at the focus state for the minimum object distance.

FIG. 6 is a diagram of various types of aberration of the fixed focus lens according the second example, at infinity focus. FIG. 7 is a diagram of various types of aberration of the fixed focus lens according the second example, at the focus state for a magnification of 0.025×. FIG. 8 is a diagram of various types of aberration of the fixed focus lens according the second example, at the focus state for the minimum object distance. In the drawings, g indicates the wavelength aberration corresponding to g-line (λ=435.83 nm), d indicates the wavelength aberration corresponding to d-line (λ=587.56 nm). Furthermore, in the drawings, s and m shown with respect to astigmatism, respectively indicate aberration at the sagittal image plane and at the meridonal image plane.

Figure 9:
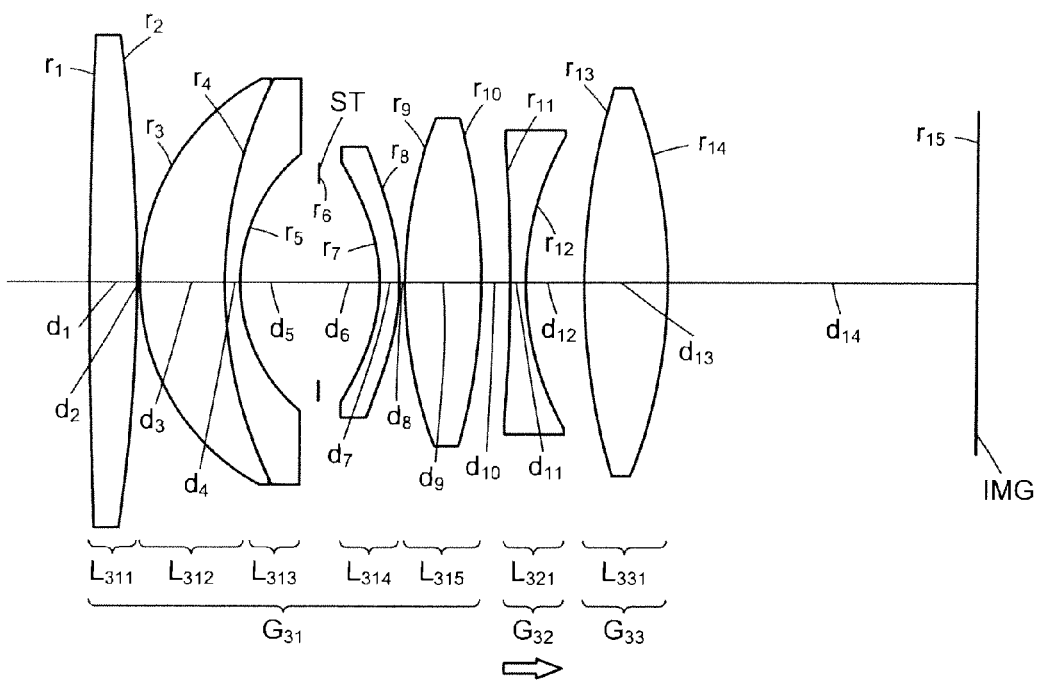
FIG. 9 is a cross sectional view (along the optical axis) of the fixed focus lens according a third example.

FIG. 9 is a cross sectional view (along the optical axis) of the fixed focus lens according a third example. The fixed focus lens includes sequentially from the object side (object not depicted), a first lens group $G_{31}$ having a positive refractive power, a second lens group $G_{32}$ having a negative refractive power, and a third lens group $G_{33}$ having a positive refractive power. At the imaging plane IMG at the rear (right side in the drawing) of the third lens group $G_{33}$, the light receiving surface of an imaging sensor such as a CCD, CMOS, etc. is disposed.

The first lens group $G_{31}$ includes sequentially from the object side, a positive lens $L_{311}$, a positive lens $L_{312}$, a negative lens $L_{313}$, a negative lens $L_{314}$, and a positive lens $L_{315}$.

The positive lens $L_{312}$ and the negative lens $L_{313}$ are cemented. Between the negative lens $L_{313}$ and the negative lens $L_{314}$, the aperture stop ST, which prescribes a given aperture, is disposed. The surface on the object side of the positive lens $L_{312}$ and both sides of the negative lens $L_{314}$ are aspheric, respectively. The first lens group $L_{31}$ is fixed and does not move during focusing.

The second lens group $G_{32}$ is configured by a negative lens $L_{321}$. The surface on the imaging plane IMG side of the negative lens $L_{321}$ is aspheric. The second lens group $G_{32}$ moves along the optical axis, from the object side toward the imaging plane IMG side, whereby focusing is performed from a state of infinity focus to the focus state for the minimum object distance.

The third lens group $G_{33}$ is configured by a positive lens $L_{331}$. The third lens group $G_{33}$ is also fixed and does not move during focusing.

Here, various values related to the fixed focus lens according the third example are given.

(Lens data)

$r_0 = \infty$ (object surface)
$d_0 = D(0)$
$r_1 = 284.746$
$d_1 = 2.440$  $nd_1 = 1.91082$  $vd_1 = 35.2$
$r_2 = -84.740$
$d_2 = 0.150$
$r_3 = 11.199$ (aspheric surface)
$d_3 = 4.358$  $nd_2 = 1.91082$  $vd_2 = 35.2$
$r_4 = 22.008$
$d_4 = 0.800$  $nd_3 = 2.00069$  $vd_3 = 25.5$
$r_5 = 8.198$
$d_5 = 4.000$
$r_6 = \infty$ (aperture stop)
$d_6 = 3.095$
$r_7 = -8.357$ (aspheric surface)
$d_7 = 1.000$  $nd_4 = 1.84666$  $vd_4 = 23.8$
$r_8 = -11.150$ (aspheric surface)
$d_8 = 0.300$
$r_9 = 22.517$
$d_9 = 3.902$  $nd_5 = 1.91082$  $vd_5 = 35.2$
$r_{10} = -29.820$
$d_{10} = D(10)$
$r_{11} = -79.568$
$d_{11} = 0.800$  $nd_6 = 1.84666$  $vd_6 = 23.8$
$r_{12} = 14.000$ (aspheric surface)
$d_{12} = D(12)$
$r_{13} = 32.737$
$d_{13} = 4.253$  $nd_7 = 1.88300$  $vd_7 = 40.8$
$r_{14} = -25.745$
$d_{14} = FB$
$r_{15} = \infty$ (imaging plane)

(Constant of the cone (K) and aspheric coefficients ($A_4, A_6, A_8, A_{10}$))
(third plane)

$K = 0$,
$A_4 = -3.66301 \times 10^{-6}, A_6 = -1.21276 \times 10^{-7}$,
$A_8 = 1.69648 \times 10^{-9}, A_{10} = -1.79277 \times 10^{-11}$
(seventh plane)

$K = 0$,
$A_4 = 3.562023 \times 10^{-4}, A_6 = 1.26121 \times 10^{-6}$,
$A_8 = 3.15187 \times 10^{-8}, A_{10} = -1.50996 \times 10^{-11}$
(eighth plane)

$K = 0$,
$A_4 = 2.66056 \times 10^{-4}, A_6 = 5.09367 \times 10^{-8}$,
$A_8 = 2.99061 \times 10^{-8}, A_{10} = -3.38903 \times 10^{-10}$ -continued (twelfth plane)

$K = 0$,
$A_4 = 1.13628 \times 10^{-5}, A_6 = -5.64832 \times 10^{-7}$,
$A_8 = 1.193354 \times 10^{-9}, A_{10} = 3.02064 \times 10^{-11}$ (Values for focusing states)

|  | Infinity | 0.025 | Minimum object distance (0.072x) |
|---|---|---|---|
| Focal length of entire optical system (F) | 28.33 | 28.40 | 28.36 |
| Focal length of first lens group $G_{31}$ (F1) | 23.47 | | |
| Focal length of third lens group $G_{33}$ (F3) | 16.90 | | |
| F no. | 2.0 | 2.0 | 2.0 |
| Half angle of view (ω) | 16.76 | 16.32 | 15.55 |
| Image height | 8.50 | 8.50 | 8.50 |
| Length of optical system | 45.5 | 45.5 | 45.5 |
| D(0) | ∞ | 1143 | 404 |
| D(10) | 1.50 | 1.97 | 2.84 |
| D(12) | 3.04 | 2.57 | 1.70 |
| FB (back focus) | 15.8 | 15.8 | 15.8 |

(Values related to conditional expression (1))
Paraxial magnification of second lens group $G_{32}$, at infinity focus (β2G) = 293.3
Paraxial magnification of third lens group $G_{33}$, at infinity focus (β3G) = 0.004
$|(1 - β2G) \times β3G| = 1.17$
(Values related to conditional expression (2))
F3/F = 0.60
(Values related to conditional expression (3))
FR2/F = 0.49
(Values related to conditional expression (4))
nd = 1.84663
(Values related to conditional expression (5))
vd = 23.8
(Values related to conditional expression (6))
F1/F = 0.83

Figure 10:
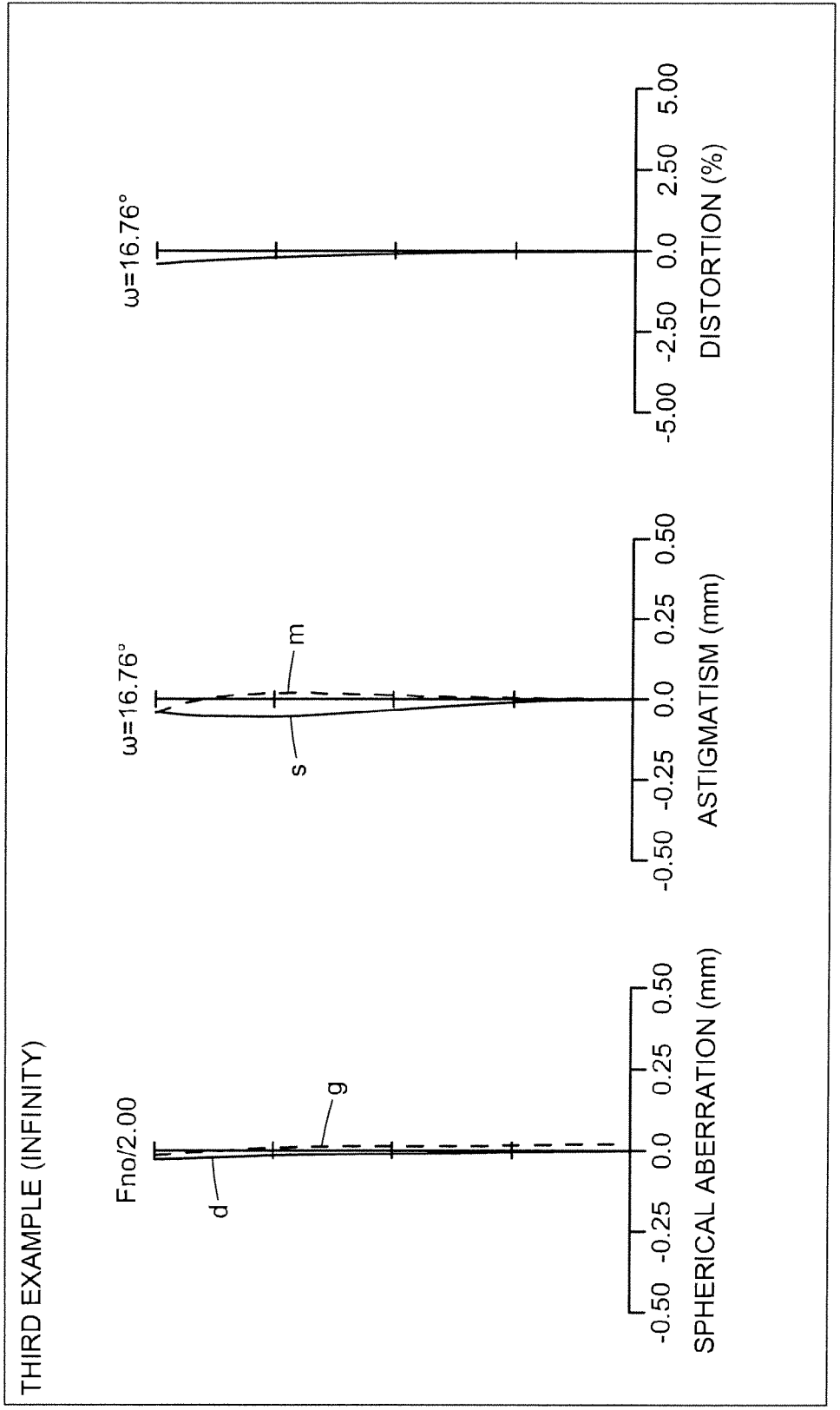
FIG. 10 is a diagram of various types of aberration of the fixed focus lens according the third example, at infinity focus.
Figure 11:
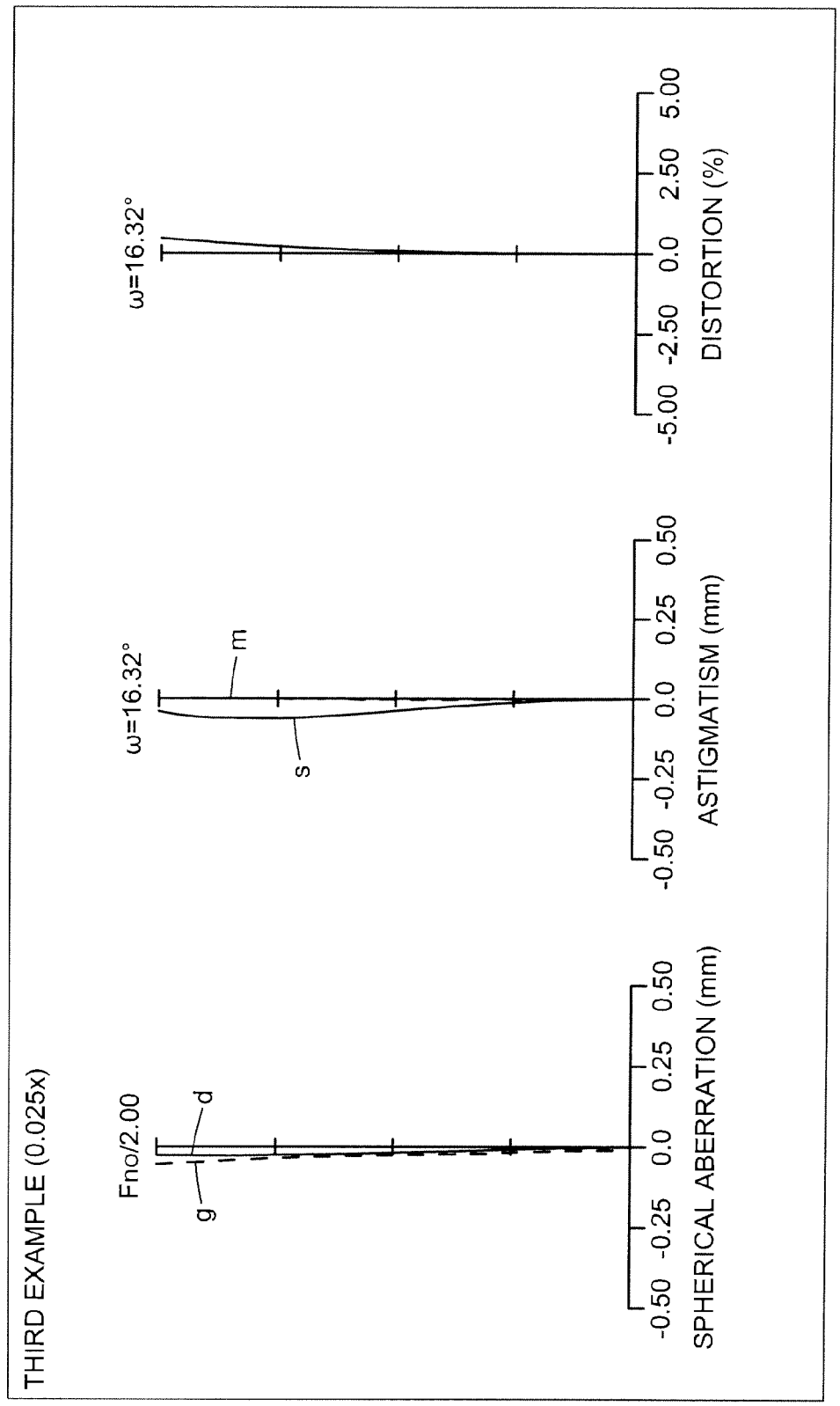
FIG. 11 is a diagram of various types of aberration of the fixed focus lens according the third example, at the focus state for a magnification of 0.025×.
Figure 12:
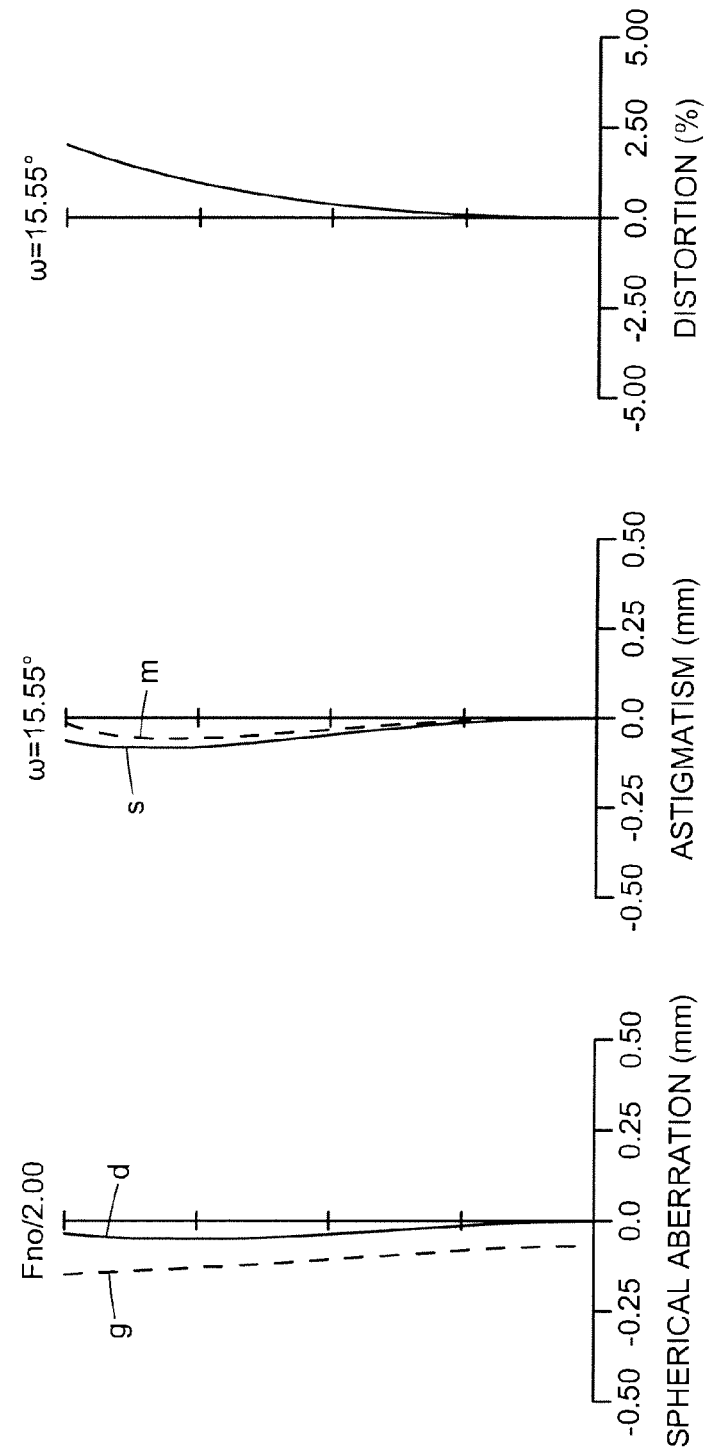
FIG. 12 is a diagram of various types of aberration of the fixed focus lens according the third example, at the focus state for the minimum object distance.

FIG. 10 is a diagram of various types of aberration of the fixed focus lens according the third example, at infinity focus. FIG. 11 is a diagram of various types of aberration of the fixed focus lens according the third example, at the focus state for a magnification of 0.025x. FIG. 12 is a diagram of various types of aberration of the fixed focus lens according the third example, at the focus state for the minimum object distance. In the drawings, g indicates wavelength aberration corresponding to g-line (λ=435.83 nm), d indicates the wavelength aberration corresponding to d-line (λ=587.56 nm). Furthermore, in the drawings, s and m shown with respect to astigmatism, respectively indicate aberration at the sagittal image plane and at the meridonal image plane.

Figure 13:
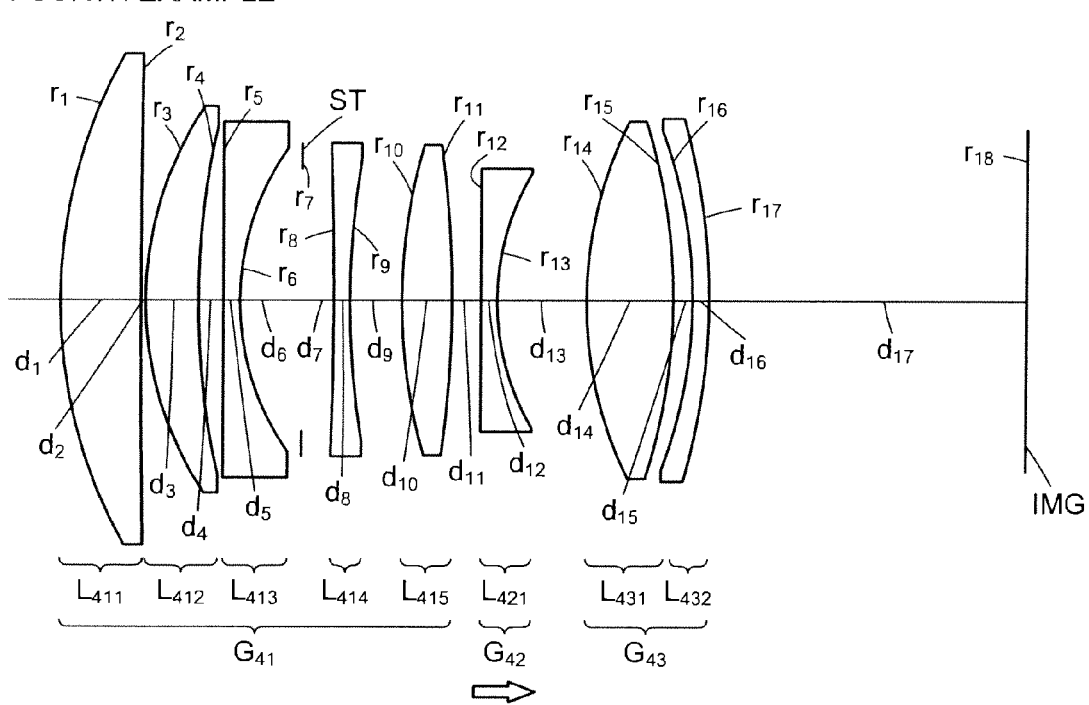
FIG. 13 is a cross sectional view (along the optical axis) of the fixed focus lens according a fourth example.

FIG. 13 is a cross sectional view (along the optical axis) of the fixed focus lens according a fourth example. The fixed focus lens includes sequentially from the object side (object not depicted), a first lens group $G_{41}$ having a positive refractive power, a second lens group $G_{42}$ having a negative refractive power, and a third lens group $G_{43}$ having a positive refractive power. At the imaging plane IMG at the rear (right side in the drawing) of the third lens group $G_{43}$, the light receiving surface of an imaging sensor such as a CCD, CMOS, etc. is disposed.

The first lens group $G_{41}$ includes sequentially from the object side, a positive lens $L_{411}$, a positive lens $L_{412}$, a negative lens $L_{413}$, a negative lens $L_{414}$, and a positive lens $L_{415}$. Between the negative lens $L_{413}$ and the negative lens $L_{414}$, the aperture stop ST, which prescribes a given aperture, is disposed. The surface on the object side of the negative lens $L_{414}$ is aspheric. The first lens group $G_{41}$ is fixed and does not move during focusing.

The second lens group $G_{42}$ is configured by a negative lens $L_{421}$. The surface on the imaging plane IMG side of the negative lens $L_{421}$ is aspheric. The second lens group $G_{42}$ moves along the optical axis, from the object side toward the imaging plane IMG side, whereby focusing is performed from a state of infinity focus to the focus state for the minimum object distance.

The third lens group $G_{43}$ includes sequentially from the object side, a positive lens $L_{431}$ and a negative lens $L_{432}$. The third lens group $G_{43}$ is also fixed and does not move during focusing.

Here, various values related to the fixed focus lens according the fourth example are given.

(Lens data)

| | | |
|---|---|---|
| $r_0 = \infty$ (object surface) | | |
| $d_0 = D(0)$ | | |
| $r_1 = 24.947$ | | |
| $d_1 = 4.087$ | $nd_1 = 1.88300$ | $vd_1 = 40.8$ |
| $r_2 = 2036.994$ | | |
| $d_2 = 0.200$ | | |
| $r_3 = 17.575$ | | |
| $d_3 = 2.647$ | $nd_2 = 1.72916$ | $vd_2 = 54.7$ |
| $r_4 = 41.758$ | | |
| $d_4 = 1.252$ | | |
| $r_5 = -626.969$ | | |
| $d_5 = 0.800$ | $nd_3 = 1.80518$ | $vd_3 = 25.5$ |
| $r_6 = 13.096$ | | |
| $d_6 = 3.118$ | | |
| $r_7 = \infty$ (aperture stop) | | |
| $d_7 = 1.600$ | | |
| $r_8 = -185.378$ (aspheric surface) | | |
| $d_8 = 0.800$ | $nd_4 = 1.68893$ | $vd_4 = 31.2$ |
| $r_9 = 45.523$ | | |
| $d_9 = 2.663$ | | |
| $r_{10} = 28.713$ | | |
| $d_{10} = 2.468$ | $nd_5 = 1.90366$ | $vd_5 = 31.3$ |
| $r_{11} = -62.409$ | | |
| $d_{11} = D(11)$ | | |
| $r_{12} = -313.795$ | | |
| $d_{12} = 0.800$ | $nd_6 = 1.56732$ | $vd_6 = 42.8$ |
| $r_{13} = 12.347$ (aspheric surface) | | |
| $d_{13} = D(13)$ | | |
| $r_{14} = 19.939$ | | |
| $d_{14} = 4.372$ | $nd_7 = 1.62041$ | $vd_7 = 60.3$ |
| $r_{15} = -30.346$ | | |
| $d_{15} = 0.977$ | | |
| $r_{16} = -24.000$ | | |
| $d_{16} = 0.800$ | $nd_8 = 1.90270$ | $vd_8 = 31.0$ |
| $r_{17} = -33.209$ | | |
| $d_{17} = FB$ | | |
| $r_{18} = \infty$ (imaging plane) | | |

(Constant of the cone (K) and aspheric coefficients ($A_4, A_6, A_8, A_{10}$))
(eighth plane)

$K = 0$,
$A_4 = 1.59362 \times 10^{-6}, A_6 = 7.92123 \times 10^{-8}$,
$A_8 = -2.39664 \times 10^{-10}, A_{10} = 5.01713 \times 10^{-12}$
(thirteenth plane)

$K = 0$,
$A_4 = -3.05079 \times 10^{-5}, A_6 = -1.28827 \times 10^{-7}$,
$A_8 = -3.92826 \times 10^{-9}, A_{10} = 3.01816 \times 10^{-11}$ (Values for focusing states)

| | Infinity | 0.025x | Minimum object distance (0.1x) |
|---|---|---|---|
| Focal length of entire optical system (F) | 38.53 | 38.36 | 37.31 |
| Focal length of first lens group $G_{41}$ (F1) | 32.29 | | |
| Focal length of third lens group $G_{43}$ (F3) | | | |
| F no. | 2.0 | 2.0 | 2.0 |
| Half angle of view ($\omega$) | 16.0 | 15.5 | 14.2 |
| Image height | 8.5 | 8.5 | 8.5 |
| Length of optical system | 48.5 | 48.5 | 48.5 |
| D(0) | $\infty$ | 1557 | 401 |
| D(11) | 1.50 | 2.20 | 4.32 |
| D(13) | 4.52 | 3.83 | 1.70 |
| FB (back focus) | 15.9 | 15.9 | 15.9 |

(Values related to conditional expression (1))
Paraxial magnification of second lens group $G_{42}$, at infinity focus ($\beta 2G$) = 5.58
Paraxial magnification of third lens group $G_{43}$, at infinity focus ($\beta 3G$) = 0.21
$|(1 - \beta 2G) \times \beta 3G| = 0.98$
(Values related to conditional expression (2))
F3/F = 0.70
(Values related to conditional expression (3))
FR2/F = 0.35
(Values related to conditional expression (4))
nd = 1.56732
(Values related to conditional expression (5))
vd = 42.8
(Values related to conditional expression (6))
F1/F = 0.92

Figure 14:
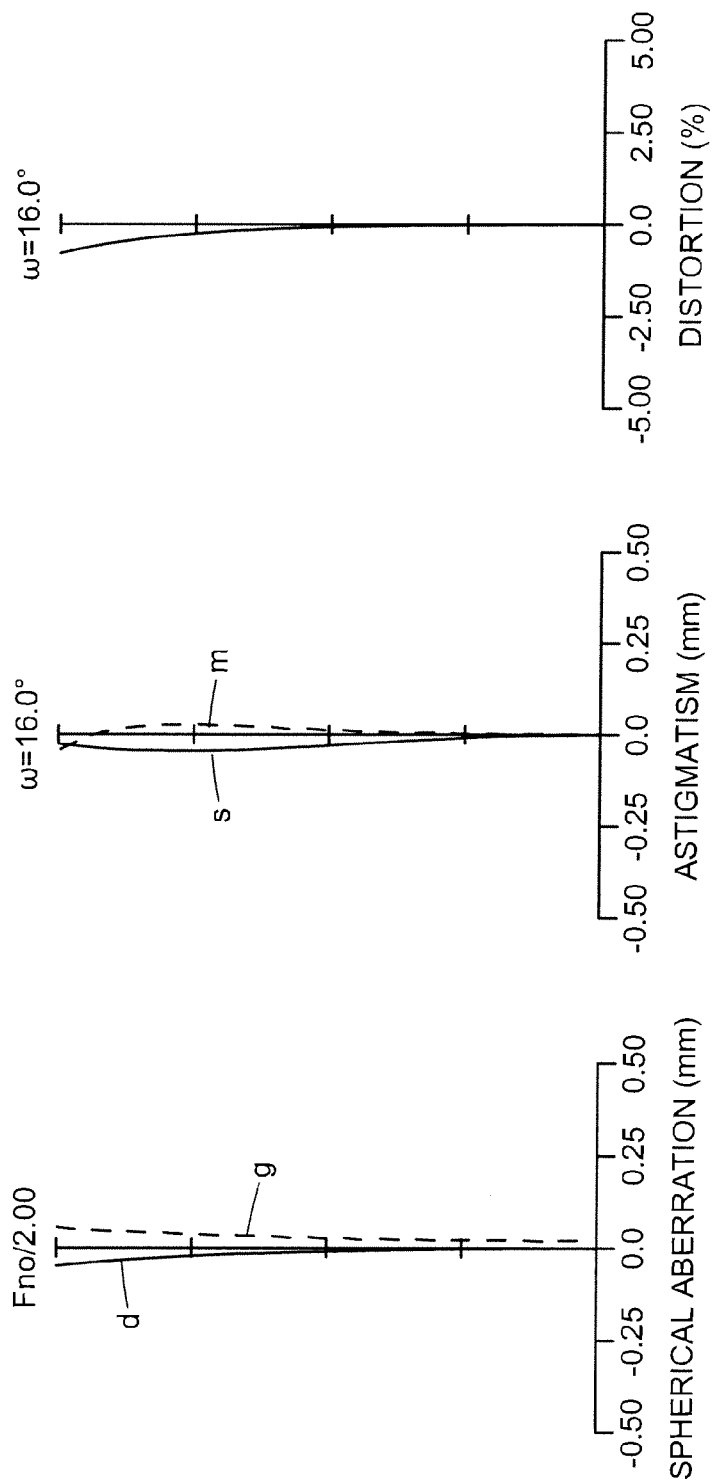
FIG. 14 is a diagram of various types of aberration of the fixed focus lens according the fourth example, at infinity focus.
Figure 15:
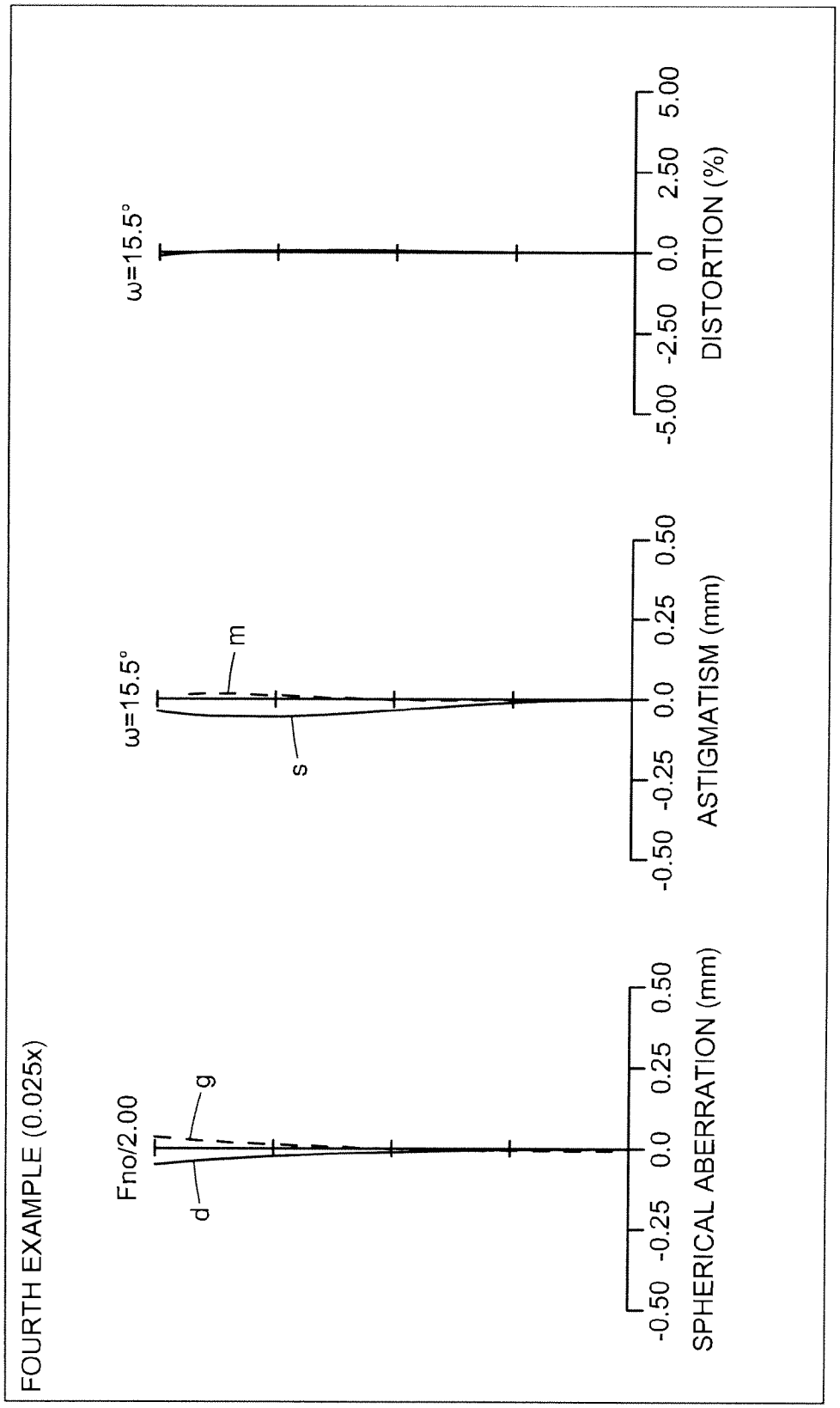
FIG. 15 is a diagram of various types of aberration of the fixed focus lens according the fourth example, at the focus state for a magnification of 0.025×.
Figure 16:
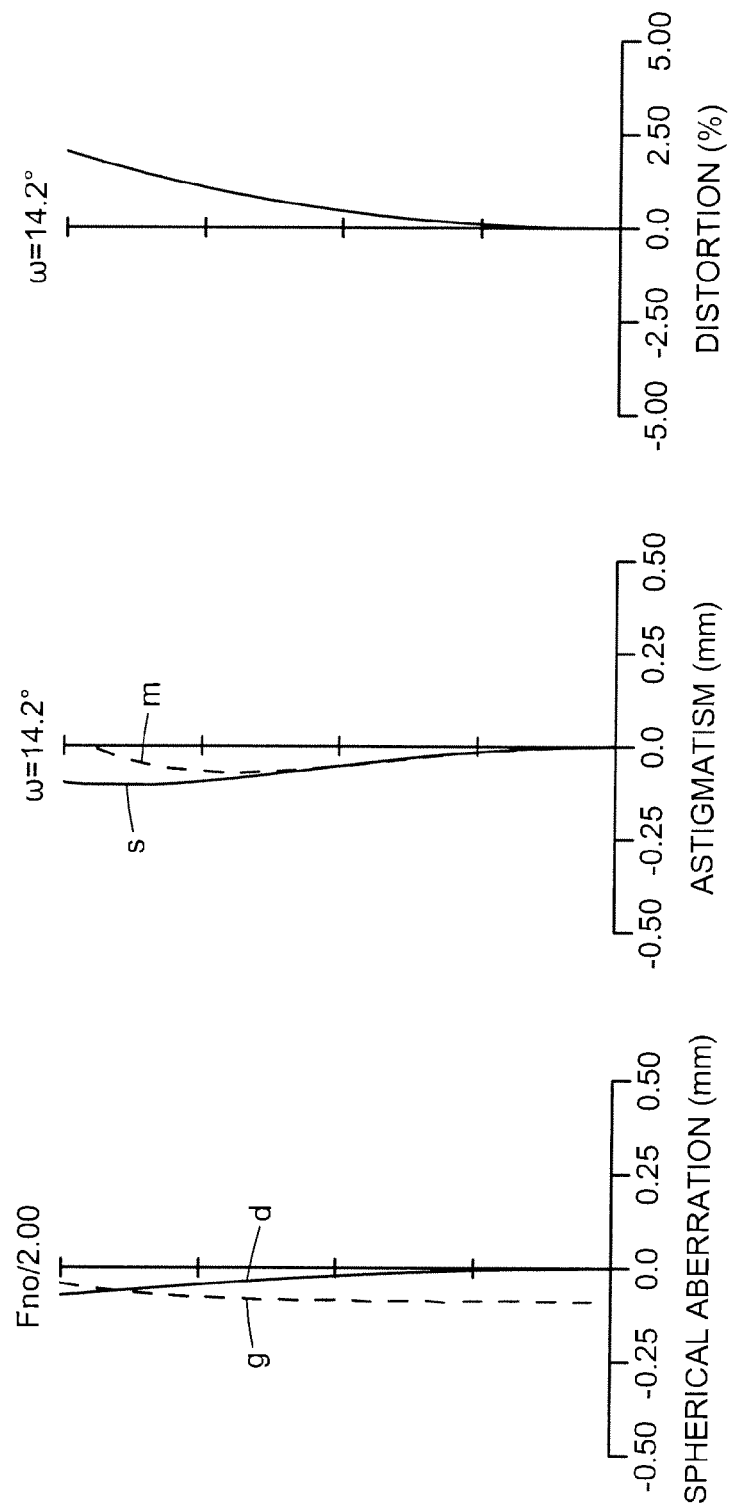
FIG. 16 is a diagram of various types of aberration of the fixed focus lens according the fourth example, at the focus state for the minimum object distance.

FIG. 14 is a diagram of various types of aberration of the fixed focus lens according the fourth example, at infinity focus. FIG. 15 is a diagram of various types of aberration of the fixed focus lens according the fourth example, at the focus state for a magnification of 0.025x. FIG. 16 is a diagram of various types of aberration of the fixed focus lens according the fourth example, at the focus state for the minimum object distance. In the drawings, g indicates the wavelength aberration corresponding to g-line ($\lambda$=435.83 nm), d indicates the wavelength aberration corresponding to d-line ($\lambda$=587.56 nm). Furthermore, in the drawings, s and m shown with respect to astigmatism, respectively indicate aberration at the sagittal image plane and at the meridonal image plane.

Among the values for each of the examples above, $r_1, r_2, \ldots$ indicate radii of curvature for each lens, diaphragm surface, etc.; $d_1, d_2, \ldots$ indicate the thickness of the lenses, diaphragm, etc. or the distance between surfaces thereof; $nd_1, nd_2, \ldots$ indicate the refraction index of each lens with respect to the d-line ($\lambda$=587.56 nm); and $vd_1, vd_2, \ldots$ indicate the Abbe number with respect to the d-line ($\lambda$=587.56 nm) of each lens. Lengths are indicated in units of [mm] and angles are indicated in [degrees].

Each aspheric surface shape above is expressed by equation [1], where Z is the depth of the aspheric surface, c is curvature (1/r), h is the height from the optical axis, the travel direction of light is positive, K is the constant of the cone, $A_4$, $A_6$, $A_8$, and $A_{10}$ are the fourth, sixth, eighth, and tenth aspheric coefficients.

$$Z = ch^2/[1 + \{1 - (1+K)c^2h^2\}^{1/2}] + A_4h^4 + A_6h^6 + A_8h^8 + A_{10}h^{10} \quad [1]$$

As described, the fixed focus lens according to each of the examples is configured by fewer lens elements, enabling weight reductions and a shortening of the length of optical system. Further, the aperture stop is disposed at an appropriate position within the first lens group, whereby various types of aberration can be favorably corrected and the front element diameter of the optical system can be reduced. By satisfying the conditional expressions above, a more compact, lightweight fixed focus lens having an inner focusing system of favorable imaging performance can be realized. The fixed focus lens according to the examples employ lenses and cemented lenses of appropriately formed aspheric surfaces, thereby enabling favorable optical performance to be maintained with fewer lens elements.

As described, the fixed focus lens according to the present invention is applicable to 35 mm cameras, video cameras, electronic still cameras, etc. and is particularly suitable for mirror-less single lens cameras having a short back focus.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

The present document incorporates by reference the entire contents of Japanese priority document, 2010-288863 filed in Japan on Dec. 24, 2010.

What is claimed is:

1. A fixed focus lens comprising, sequentially from an object side,
    a first lens group having a positive refractive power;
    a second lens group having a negative refractive power; and
    a third lens group having a positive refractive power, wherein
    the first lens group includes an aperture stop,
    the second lens group is configured by a single lens element,
    during focusing, the second lens group moves along an optical axis and the first lens group and the third lens group are fixed with respect to an imaging plane,
    a conditional expression (6) $0.3<F1/F<1.1$ is satisfied, where F1 is a focal length of the first lens group and F is a focal length of the entire optical system, and
    a conditional expression (1) $0.7<|(1-\beta 2G)\times\beta 3G|<7.0$ is satisfied, where $\beta 2G$ is paraxial magnification of the second lens group, at infinity focus and $\beta 3G$ is paraxial magnification of the third lens group, at infinity focus.

2. The fixed focus lens according to claim 1, wherein the third lens group is configured by one positive lens, or a positive lens and a negative lens, and satisfies a conditional expression (2) $0.4<F3/F<1.8$, where F3 is a focal length of the third lens group and F is a focal length of the entire optical system.

3. The fixed focus lens according to claim 2, wherein a conditional expression (3) $0.2<FR2/F<0.6$ is satisfied, where FR2 is radius of curvature of a surface on an imaging plane side of the second lens group and F is a focal length of the entire optical system.

4. The fixed focus lens according to claim 3, wherein conditional expressions (4) $1.50<nd<2.0$ and (5) $25<\upsilon d<68$ are satisfied, where nd is average refractive index at d-line of the second lens group and $\upsilon d$ is average Abbe number at d-line of the second lens group.

* * * * *